United States Patent
James

(10) Patent No.: US 9,359,152 B2
(45) Date of Patent: Jun. 7, 2016

(54) METHOD AND APPARATUS FOR PROVIDING OVER-PRESSURE PROTECTION FOR AN UNDERGROUND STORAGE CAVERN

(71) Applicant: Phillip James, Houston, TX (US)

(72) Inventor: Phillip James, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 0 days.

(21) Appl. No.: 14/464,081

(22) Filed: Aug. 20, 2014

(65) Prior Publication Data
US 2015/0321847 A1 Nov. 12, 2015

Related U.S. Application Data

(63) Continuation of application No. 14/270,465, filed on May 6, 2014.

(51) Int. Cl.
*B65G 5/00* (2006.01)
*B65G 53/66* (2006.01)
(Continued)

(52) U.S. Cl.
CPC ............ *B65G 53/66* (2013.01); *B01D 46/0034* (2013.01); *B01D 46/0036* (2013.01); *B01D 53/261* (2013.01); *B03C 1/02* (2013.01); *B65G 5/00* (2013.01); *B65G 43/08* (2013.01); *B65G 53/30* (2013.01); *B65G 53/58* (2013.01); *F16K 15/00* (2013.01); *F17C 1/007* (2013.01); *F17C 7/00* (2013.01); *F17D 5/00* (2013.01); *G01L 7/00* (2013.01); *B03C 2201/20* (2013.01); *F17C 2205/0326* (2013.01); *F17C 2205/0332* (2013.01); *F17C 2205/0338* (2013.01); *F17C 2205/0341* (2013.01); *F17C 2221/012* (2013.01); *F17C 2221/013* (2013.01); *F17C 2221/014* (2013.01); *F17C 2221/016* (2013.01); *F17C 2221/017* (2013.01); *F17C 2221/031* (2013.01); *F17C 2223/0123* (2013.01); *F17C 2223/035* (2013.01); *F17C 2223/036* (2013.01);
(Continued)

(58) Field of Classification Search
USPC ........................................... 405/53; 137/236.1
See application file for complete search history.

(56) References Cited

U.S. PATENT DOCUMENTS 3,653,512 A * 4/1972 Brown .......................... 210/130
3,848,427 A * 11/1974 Loofbourow ................... 62/260
(Continued)

FOREIGN PATENT DOCUMENTS

DE 10117617 10/2002
EP 0086506 8/1983
(Continued)

OTHER PUBLICATIONS

International Search Report and Written Opinion for PCT/US2015/029400, mailed Jul. 21, 2015.
(Continued)

*Primary Examiner* — Tara M. Pinnock
(74) *Attorney, Agent, or Firm* — Justin K. Murray

(57) ABSTRACT

A method and apparatus is provided which will provide over-pressure protection for an underground storage cavern by reducing the pressure of a pressurized gas stream originating from the an underground storage cavern to form a lower pressure gas stream, monitoring the pressure of a lower pressure gas stream and stopping the flow of the lower pressure gas stream to the pipeline should the pressure of the lower pressure gas stream exceed a threshold value.

13 Claims, 1 Drawing Sheet

(51) Int. Cl.
    G01L 7/00      (2006.01)
    F16K 15/00     (2006.01)
    B01D 46/00     (2006.01)
    B65G 53/30     (2006.01)
    B65G 53/58     (2006.01)
    B65G 43/08     (2006.01)
    F17D 5/00      (2006.01)
    B01D 53/26     (2006.01)
    B03C 1/02      (2006.01)
    F17C 1/00      (2006.01)
    F17C 7/00      (2006.01)

(52) U.S. Cl.
    CPC ... *F17C2225/0123* (2013.01); *F17C 2225/035* (2013.01); *F17C 2250/043* (2013.01); *F17C 2250/0443* (2013.01); *F17C 2250/0657* (2013.01); *F17C 2270/0152* (2013.01); *Y02E 60/321* (2013.01); *Y10T 137/7837* (2015.04); *Y10T 137/7842* (2015.04)

(56) References Cited

U.S. PATENT DOCUMENTS

| | | | |
|---|---|---|---|
| 5,207,530 A * | 5/1993 | Brooks et al. | 405/55 |
| 5,333,465 A * | 8/1994 | McBride | 62/53.1 |
| 6,412,508 B1 * | 7/2002 | Swann, Jr. | 137/1 |
| 6,527,002 B1 * | 3/2003 | Szakaly | 137/14 |
| 6,840,709 B2 * | 1/2005 | Dahlem et al. | 405/53 |
| 2002/0174895 A1 | 11/2002 | Hill et al. | |
| 2003/0115889 A1 | 6/2003 | Bishop et al. | |
| 2004/0136784 A1 * | 7/2004 | Dahlem et al. | 405/52 |
| 2005/0220704 A1 | 10/2005 | Morrow et al. | |
| 2011/0305515 A1 * | 12/2011 | Drnevich | 405/53 |
| 2013/0213479 A1 | 8/2013 | Oates et al. | |
| 2013/0315669 A1 | 11/2013 | Oates | |

FOREIGN PATENT DOCUMENTS

| | | |
|---|---|---|
| GB | 2460550 | 12/2009 |
| WO | WO 2013173709 | 11/2013 |

OTHER PUBLICATIONS

International Search Report and Written Opinion for PCT/US2015/029662, mailed Jul. 29, 2015.

Barron, T.F, "Regulatory, Technical Pressures Prompt More U.S. Salt-Cavern Gas Storage," Oil and Gas Journal, Pennwell, Houston, TX, US., vol. 92, No. 27, Sep. 12, 1994.

Pottier, et al, "Mass Storage of Hydrogen," Nato ASI Series, Series E, Applied Sciences; Hydrogen Energy System: Production and Utilization of Hydrogen and Future Aspects; vol. 295, Jan. 1, 1995, pp. 167-179.

* cited by examiner

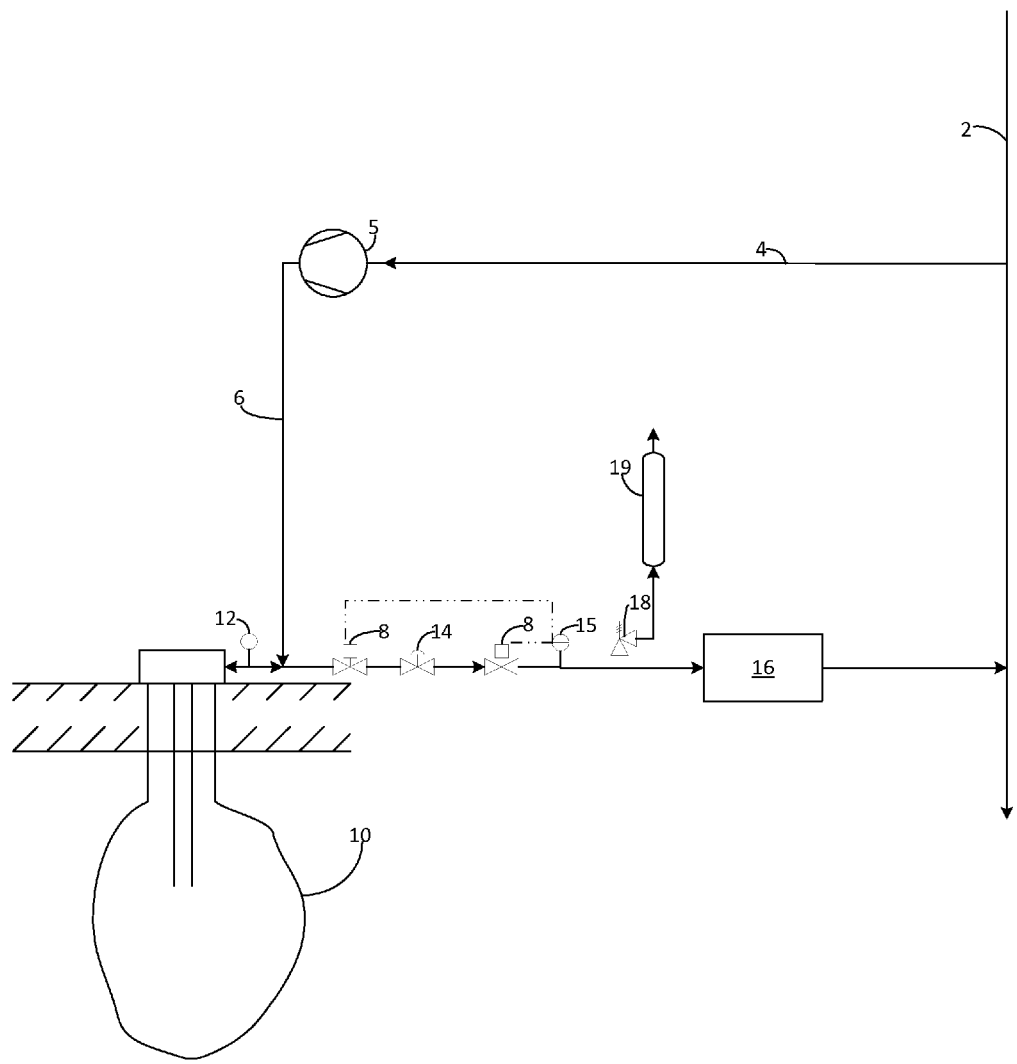

METHOD AND APPARATUS FOR PROVIDING OVER-PRESSURE PROTECTION FOR AN UNDERGROUND STORAGE CAVERN

CROSS-REFERENCE TO RELATED APPLICATION

This patent application is a continuation of U.S. application Ser. No. 14/270,465, filed May 6, 2014, the entire contents of which are incorporated herein by reference.

TECHNICAL FIELD OF THE INVENTION

The present invention relates to a method and apparatus for improving the operational safety in handling a pressurized gas originating from an underground storage cavern.

BACKGROUND OF THE INVENTION

It is known to store hydrogen, as well as other gases in salt caverns. These large storage sites help to provide a buffer in the event when customer demand exceeds normal production capacity or if production capacity is reduced below normal levels. For various reasons, the pressures within these large salt caverns can be very high, sometimes greatly exceeding the pressure of the pipeline to which the gas will be subsequently introduced. One method of controlling the pressure of the gas is to use a pressure control device, which is configured to safely reduce the pressure of the gas before it is introduced to the pipeline. However, if this device were to fail, the overall safety would be compromised. A solution known heretofore has been to include a pressure relief valve downstream the pressure control device, which allows for the system to depressurize to a vent or flare stack. Unfortunately, this solution requires a large capital expenditure as the vent or flare stack must be sized large enough to handle the entire volume of the underground storage cavern.

SUMMARY OF THE INVENTION

Certain embodiments of the present invention relate to a method and apparatus for providing over-pressure protection for an underground storage cavern.

In one embodiment, the method can include the steps of removing the pressurized gas from the underground storage cavern, reducing the pressure of the pressurized gas to form a lower pressure gas, monitoring the pressure of the lower pressure gas, and if the pressure of the lower pressure gas exceeds a first threshold value, sending a signal to a controller to close a set of isolation valves located upstream of a pressure relief valve. By including the set of isolation valves, the size of the vent or flare stack associated with the pressure relief valve can be reduced without compromising safety.

According to other optional aspects of the invention:
the pressurized gas is at a sufficiently high pressure within the underground storage cavern such that the method comprises an absence of an additional pressurization step between removing the pressurized gas from the underground storage cavern and introducing the lower pressure gas to the pipeline;
the method further includes the step of venting at least a portion of the lower pressure gas to a vent or flare stack via a pressure relief valve if the pressure of the lower pressure gas exceeds a second threshold value;
the first threshold value and the second threshold value are the same;
the method further includes the step of removing moisture and/or impurities from the lower pressure gas in downstream equipment before the step of introducing the lower pressure gas to the pipeline;
the downstream equipment is located downstream the isolation valves and upstream the pipeline;
the downstream equipment comprises driers configured to remove moisture from the lower pressure gas;
the downstream equipment comprises filters configured to remove solid particles from the lower pressure gas;
the first threshold value is based on a pressure rating of the downstream equipment and/or the pipeline; and
the pressurized gas is selected from the group consisting of nitrogen, natural gas, air, carbon dioxide, hydrogen, helium, argon, and combinations thereof;

In another embodiment of the invention, the apparatus can include a pressure reducing device in fluid communication with the underground storage cavern, a pressure monitor configured to monitor the pressure of the lower pressure gas, at least one isolation valve in fluid communication with the pressure reducing device, and downstream equipment disposed downstream the pressure reducing device, the downstream equipment having a maximum operating pressure. In one embodiment, the pressure reducing device is configured to reduce the pressure of the pressurized gas received from the underground storage cavern to form a lower pressure gas. In another embodiment, the at least one isolation valve is configured to stop the flow of gas if the pressure monitor senses the pressure of the lower pressure gas exceeds a first threshold value.

According to other optional aspects of the invention:
the downstream equipment comprises a water removing device having a pair of desiccant driers configured in a permutable fashion such that one of the driers can be in operation while the other dryer is being regenerated;
the downstream equipment comprises a particle removal device having a mechanical filtration system having a filter housing, wherein the mechanical filtration system is configured to allow for isolation of the filter housing;
the particle removal system comprises a magnetic separation system configured to remove fine dust particles based on magnetic properties;
the first threshold value is based on the maximum operating pressure of the downstream equipment;
the apparatus further includes a pressure relief valve located downstream the isolation valve, the pressure relief valve configured to send at least a portion of the lower pressure gas to a vent or flare stack if the pressure of the lower pressure gas exceeds a second threshold value; and
the first threshold value and the second threshold value are the same.

BRIEF DESCRIPTION OF THE DRAWINGS

These and other features, aspects, and advantages of the present invention will become better understood with regard to the following description, claims, and accompanying drawing. It is to be noted, however, that the drawing illustrates only an embodiment of the invention and is therefore not to be considered limiting of the invention's scope as it can admit to other equally effective embodiments.

The FIGURE shows a method and apparatus for providing over-pressure protection for an underground storage cavern in accordance with an embodiment of the present invention.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

High pressure gases, including, but not limited to: nitrogen, air, carbon dioxide, hydrogen, helium, and argon, can be stored in caverns, whether leached in salt formations or created by hard rock mining. Additionally, the pressure of these gases exiting the cavern can be at very high pressures (e.g., 100-200 atmospheres), which can cause safety issues for downstream equipment and the mechanical integrity of the pipeline.

Now turning to the FIGURE. The gas is withdrawn from pipeline 2 via line 4 and compressed in compressor 5 to a pressure that is sufficiently high enough such that the gas can be removed from underground storage cavern 10 without any mechanical means (e.g., pumps, etc. . . . ), preferably to a pressure of 10 atmospheres or higher, more preferably to 100-200 atmospheres. Following compression, the gas travels via line 6. When pressure control device 14 is in a closed position, the gas is then directed into underground storage cavern 10. The flow rate of the gas going in and out of underground storage cavern can be monitored by flow indicator 12.

When it is desired to use gas from underground storage cavern 10, pressure control device 14 is opened, which allows for the gas to expand across pressure control device 14 before heading to downstream equipment 16, which can include equipment for moisture removal and/or removal of any unwanted impurities (e.g., solid particles, magnetic particles, unwanted gases) before being introduced back to pipeline 2.

In one embodiment of the invention, an over-pressurization system can be installed should pressure control device 14 fail to safely control the pressure of the gas for the downstream equipment 16 and pipeline 2. The pressure of the gas following pressure control device 14 can be monitored by pressure indicator 15. Pressure relief valve 18 can be installed downstream pressure control device 14 in order to de-pressurizes the system to a vent or flare stack 19 in the event that the monitored pressure is too high. In the embodiment shown, isolation valves 8 are included, preferably both upstream and downstream of pressure control device 14, which help to reduce the height of the vent or flare stack and provide additional safety protection.

In one embodiment, isolation valves 8 would be closed if the pressure of the lower pressure gas (i.e., gas downstream of pressure control device 14) as measured by pressure indicator 15 is above a certain operational threshold (e.g., close to or just below the pressure rating of downstream equipment 16 and pipeline 2). In one embodiment, pressure indicator 15 is in electronic communication with isolation valves 8, either directly or through a controller (not shown), such that pressure indicator 15 is configured to send a signal to isolation valves 8 to close. In one embodiment, pressure relief valve 18 and vent or flare stack can be included to provide over-pressure protection until isolation valves 8 are closed. In one embodiment, since the design of pressure relief valve 18 is primarily to provide over-pressure protection until the isolation valves are closed, pressure relief valve 18 can be smaller and the vent or flare stack height can be reduced due to the reduced thermal radiation.

In one embodiment, the pressure of the gas in the cavern is maintained above the pipeline pressure. This advantageously allows for the absence of a mechanical device to help with movement of the gas to the pipeline (e.g., no need for an additional pump to move the gas from the storage cavern to the pipeline).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps or devices can be combined into a single step/device.

The singular forms "a", "an", and "the" include plural referents, unless the context clearly dictates otherwise.

"Comprising" in a claim is an open transitional term which means the subsequently identified claim elements are a non-exclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

I claim:

1. A method for providing over-pressure protection for an underground storage cavern and a pipeline in fluid communication with the underground storage cavern, wherein the underground storage cavern is a salt cavern, the method comprising the steps of:

provinding an over-pressurization system comprising a pressure monitor, an isolation valve, and a pressure relief valve, wherein the isolation valve is fluidly connected between underground storage and the pipeline, wherein the pressure relief valve is fluidly connected between the underground storage and the pipeline, wherein the pressure relief valve is downstream of the isolation valve;

receiving a pressurized gas from the underground storage cavern, wherein the pressurized gas is at a pressure exceeding the pressure within the pipeline;

flowing the pressurized gas through a pressure reducing device configured to reduce the pressure of the pressurized gas received from the underground storage cavern;

monitoring the pressure of the pressurized gas downstream of the pressure reducing device using the pressure monitor;

introducing the pressurized gas to the pipeline if the pressure of the pressurized gas downstream of the pressure reducing device is below a first threshold value; and closing the isolation valve upstream of the pressure relief valve if the pressure of the pressurized gas downstream of the pressure reducing device is at or exceeds the first threshold value, such that the flow of the pressurized gas to the pipeline and the pressure relief valve is stopped.

2. The method as claimed in claim 1, wherein the pressurized gas is at a sufficiently high pressure within the underground storage cavern such that the method comprises an absence of an additional pressurization step between receiving the pressurized gas from the underground storage cavern and introducing the pressurized gas to the pipeline.

3. The method as claimed in claim 1, further comprising the step of venting at least a portion of the pressurized gas to a vent or flare stack via the pressure relief valve if the pressure of the pressurized gas downstream of the pressure reducing device exceeds a second threshold value.

4. The method as claimed in claim 3, wherein the first threshold value and the second threshold value are the same.

5. The method as claimed in claim 1, further comprising the step of removing moisture and/or impurities from the pressurized gas in downstream equipment before the step of introducing the pressurized gas to the pipeline.

6. The method as claimed in claim 5, wherein the downstream equipment is located downstream the isolation valves and upstream the pipeline.

7. The method as claimed in claim 5, wherein the downstream equipment comprises driers configured to remove moisture from the lower pressure gas.

8. The method as claimed in claim 5, wherein the downstream equipment comprises filters configured to remove solid particles from the lower pressure gas.

9. The method as claimed in claim 5, wherein the first threshold value is based on a pressure rating of the downstream equipment and/or the pipeline.

10. The method as claimed in claim 1, wherein the pressurized gas is selected from the group consisting of nitrogen, natural gas, air, carbon dioxide, hydrogen, helium, argon, and combinations thereof.

11. The method as claimed in claim 1, wherein the pressurized gas is hydrogen.

12. A method for providing over-pressure protection for an underground storage cavern and a pipeline fluidly connected to the underground storage cavern, wherein the underground storage cavern is a salt cavern, the method comprising the steps of:
    providing an over-pressurization system comprising a pressure monitor, an isolation valve, and a pressure relief valve, wherein the isolation valve is fluidly connected between underground storage and the pipeline, wherein the pressure relief valve is fluidly connected between the underground storage and the pipeline, wherein the pressure relief valve is downstream of the isolation valve;
    receiving a pressurized gas from the underground storage cavern, wherein the pressurized gas is at a pressure exceeding the pressure within the pipeline;
    flowing the pressurized gas through a pressure reducing device configured to reduce the pressure of the pressurized gas received from the underground storage cavern;
    monitoring the pressure of the pressurized gas downstream of the pressure reducing device using the pressure monitor;
    determining whether the pressure reducing device has suffered a failure;
    in the event of determination of a failure of the pressure reducing device, closing the isolation valve upstream of the pressure relief valve thereby preventing flow of the pressurized gas to the pipeline and the pressure relief valve; and
    in the event of determination of a non-failure of the pressure reducing device, introducing the pressurized gas to the pipeline.

13. The method as claimed in claim 12, wherein said determining step includes the step of comparing the monitored pressure of the pressurized gas downstream of the pressure reducing device to a threshold value, wherein failure of the pressure reducing device is characterized as the monitored pressure of the pressurized gas downstream of the pressure reducing device being above the threshold value.

\* \* \* \* \*